United States Patent [19]
White

[11] Patent Number: 4,673,996
[45] Date of Patent: Jun. 16, 1987

[54] MAGNETIC HEAD AIR BEARING SLIDER ASSEMBLY UTILIZING TRANSVERSE PRESSURIZATION CONTOURS

[76] Inventor: James W. White, 1816 Chicadee Dr., Knoxville, Tenn. 37919

[21] Appl. No.: 728,311

[22] Filed: Apr. 29, 1985

[51] Int. Cl.⁴ .............................................. G11B 5/60
[52] U.S. Cl. .................................................... 360/103
[58] Field of Search ......................................... 360/103

[56] References Cited
U.S. PATENT DOCUMENTS

| 3,823,416 | 7/1974 | Warner | 360/103 |
| 3,855,625 | 12/1974 | Garnier et al. | 360/103 |
| 4,218,715 | 8/1980 | Garnier | 360/103 |
| 4,285,019 | 8/1981 | Scott et al. | 360/103 |
| 4,475,135 | 10/1984 | Warner et al. | 360/103 |

FOREIGN PATENT DOCUMENTS 0158061 9/1982 Japan .................................. 360/103

Primary Examiner—Robert S. Tupper
Attorney, Agent, or Firm—Pitts and Brittian

[57] ABSTRACT

A slider head assembly for flying a magnetic head at very low clearances on a fluid film over a moving recording media. This improved slider head assembly has at least one air bearing surface that flies above the recording medium due to pressurization of air under that bearing surface as the recording medium is rotated. The air bearing surface is provided with a transverse pressurization contour (TPC) along each side edge of the bearing surface such that any air flow from the side of the slider assembly, due to skew angle operation and/or access velocity, produces pressurization adjacent to one side edge and expansion adjacent to the other side edge of each air bearing surface. The pressure distribution across each air bearing surface is substantially symmetrical from side to side. This construction makes the slider assembly flying height and roll angle essentially insensitive to skew angle and/or access velocity. One of the embodiments utilizes a TPC having a linear taper of generally less than one degree. This embodiment is produced with a minor modification to conventional fabrication techniques.

20 Claims, 11 Drawing Figures

MAGNETIC HEAD AIR BEARING SLIDER ASSEMBLY UTILIZING TRANSVERSE PRESSURIZATION CONTOURS

DESCRIPTION

1. Technical Field

This invention relates generally to magnetic head slider assemblies for use in magnetic read/write systems employing rapidly moving recording media, and more particularly to a slider assembly which produces an improved air bearing characteristic for the slider when it is skewed and/or moves relative to the recording media.

2. Background of the Invention

Magnetic recording systems utilizing transducers that are supported by an air bearing film as they move relative to the surface of a magnetic recording disk are well known in the art. Such transducers "fly" at just a few microinches above a rotating disk surface. The transducer is mounted in a slider assembly which has a contoured surface. The air bearing film is produced by pressurization of the air as it flows between the disk and slider and is a consequence of the slider contour and relative motion of the two surfaces. The purpose of the air bearing is to provide, with minimal contact, a very narrow clearance between the slider and rotating disk. This allows a high density of magnetic data to be transferred and reduces the wear and damage to the magnetic assembly and recording media during operation.

Typical sliders of the prior art, as illustrated in FIG. 1, utilize at least two lower rails having flat surfaces toward the recording medium, each of these rails having a tapered forward surface toward the direction of rotation of the recording medium, whereby the rotating medium forces air by viscous effects into the taper and thereby produces a pressure beneath each of the rails resulting in the air bearing. These sliders are typically gimbal mounted to a flexure which is attached to an arm. The arm is driven by an actuator which positions the transducer over the recording surface from one data track to another. The arm can move in a linear motion which is termed linear access or it can rotate which is termed rotary access. With rotary access, the slider will be positioned at varying angles with respect to the direction of disk rotation as the slider moves over the recording surface. This angular orientation is referred to as the "skew" angle.

When a typical slider is positioned having any angular skew, the rotation of the disk introduces pressurized air at the forward edge, thereby generating the air bearing. However, this air is pressurized at a reduced value because of the skew, and gives rise to a reduction in the flying height. Also, the skew angle gives rise to a roll of the slider such that the air bearing flying height is not uniform under both of the rails. Accordingly, the position of the transducer with respect to the recording medium can vary as the slider is caused to roll in one direction or the other or fly at different heights. Such variations in flying height adversely affect the data transfer between transducer and recordinq medium. Furthermore, the slider must move radially across the recording disk at a substantial rate of speed to access various portions of the disk. This motion also introduces air under one edge of each slider rail and results in a roll of the slider and a change in the spacing between the transducer and the recording medium. When any of these variations of spacing occur, particularly with a substantially reduced spacing between the slider and the disk, contact may occur between the slider (and its transducer) and the recording medium, or at least potentially rough surfaces thereof. Any such contact, of course, introduces wear into the slider and the recording surface.

Numerous magnetic head slider assemblies have been developed in the rapidly developing art of high speed recording/reading. Typical of these developments is the transducer assembly described in U.S. Pat. No. 3,823,416, issued to M. W. Warner on July 9, 1974. In this particular construction, there are two principle side rails having tapered front edges that produce the air film necessary to raise the transducer assembly above the recording medium. In addition, there is a center rail to which the transducer is attached at a trailing edge. By positioning the transducer along this center rail, the effects of roll upon the spacing of the transducer from the recording medium is minimized.

Another magnetic head slider assembly is that described in my U.S. Pat. No. 3,855,625, issued on Dec. 17, 1974. In this patent is described a slider support for a magnetic head assembly that is formed with a tapered flat or step flat forward edge on the outer rails, with a recessed portion delineated by a reverse step between the rails. This construction affects the air bearing to improve upon the stability and uniformity of flying height of the magnetic head of the device.

Another device in this general field is described in U.S. Pat. No. 4,218,715, issued to M. F. Garnier on Aug. 19, 1980. In this patent is taught the use of a negative pressure region between the rails and shallow recesses or reliefs formed in the rails so that the ambient pressure is substantially maintained in the areas of such recesses along the rails. This slider is alleged to be relatively insensitive to skew and disk curvature due to flutter or static deformation.

Still another device is described in U.S. Pat. No. 4,285,019, issued to J. C. Scott, et al. on Aug. 18, 1981. The slider of this patent is manufactured to have a substantially continuous curved surface from the front to the back of the slider rather than a planar surface as in other of the above-cited devices. With this construction it is alleged that the trailing edge, by being along a curve, is better protected from making contact with the recording medium during operation or start/stop conditions, thereby minimizing damage to the transducer. This patent also teaches that a continuous curvature can exist across the slider as would be produced by machining the entire lower surface of the slider to a spherical contour.

Still another patent of this technology is U.S. Pat. No. 4,475,135, issued to M. W. Warnier, et al., on Oct. 2, 1984. The slider of this patent has a continuously tapered surface across the front edge thereof to pressurize the air, a pair of axially extending rails, and an area between the two that is recessed to provide a region of negative pressure. This construction is alleged to provide an extremely fast lift off of the slider from the disk surface as the disk begins to rotate. Thus, minimum wear occurs during initial startup and stopping of the disk.

Although several of the above-referenced patents acknowledge the existence of a roll of the slider during operation, none of them appears to address the problem of preventing such roll.

Accordingly, it is a principal object of the present invention to provide a highly controlled thin pressurized film of air between the magnetic assembly and the spinning magnetic disk.

It is a further object of the present invention to provide an improved magnetic head air bearing slider for magnetic recording systems that displays a high degree of insensitivity of clearance and roll angle to the slider skew.

It is another object of the present invention to provide a slider whose flying height and roll angle are highly insensitive to slider access velocity.

It is also an object of the present invention to provide a slider that exhibits a rapid lift off from the disk surface when rotation is started with the slider in a skewed position in contact with the disk.

It is another object of the present invention to provide a slider possessing substantial ability to satisfactorily perform without contact by roughness on the disk surface during skewed slider orientation and/or rapid slider access over the recording medium.

It is an additional object of the present invention to provide a slider that is easy to manufacture and which does not require a significant increase in cost over the conventional slider assemblies that are presently in use.

Other objects of the present invention will become apparent upon consideration of the drawings set forth hereinafter, and a complete discussion of the invention with respect to those drawings.

DISCLOSURE OF THE INVENTION

According to the present invention an air bearing surface of a magnetic head air bearing slider is described by two or more coplanar rails extending rearwardly from a forward edge and separated by an ambient pressure relief slot. Each air bearing rail is sloped at its forward edge so as to pressurize incoming air flow to produce lift for the slider assembly. Furthermore, each of the rails is provided with an edge contour such that one edge serves for pressurization and the other edge for depressurization of each of the rails when the slider is skewed and/or during access, with their function depending upon the direction of skew angle and access direction of the slider assembly. These edge contours are referred to as transverse pressurization contours (TPC). With this construction, the air bearing formed between the slider and the recording medium is not degraded by slider skew angle or access velocity. This results in very little roll and very little tendency to change the flying height due to skew or access, and provides rapid lift off when the slider is in a skewed position relative to the direction of rotation of the recording disk. This permits a wider range of skew angles, and a higher access velocity than can be utilized without the advantages produced by the present invention.

DETAILED DESCRIPTION OF THE INVENTION

Figure 1:
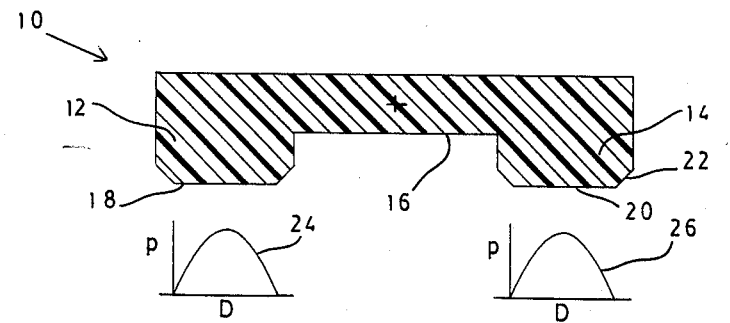
FIG. 1 is a cross section of a typical slider of the prior art showing the transverse pressure distribution under each of the rails of the slider when there is no skew angle or no access of the slider.

A description of the performance of a conventional slider head is desirable to fully understand the performance of the present invention. A typical head of the prior art is illustrated in FIG. 1 and consists of a pair of parallel rails 12 and 14 separated by a recess 16 open from front to rear. These rails provide a pair of air bearings 18 and 20, respectively. It is common practice to chamfer the edge of the rails as at 22 so that the edges do not chip from any contact between the rails and the recording medium. In addition, the chamfer serves to help control the width of the slider rails. This chamfer is typically about 45 degrees. Also, shown in FIG. 1 is a typical pressure profile across each of the rails 18 and 20 as produced when there is no skew angle between the slider head 10 and the recording medium, and when the head is not accessing across the medium. Under these conditions, the pressure profile 24 for the rail 18 is substantially symmetrical as shown as is the pressure profile 26 for the rail 20.

Figure 2:
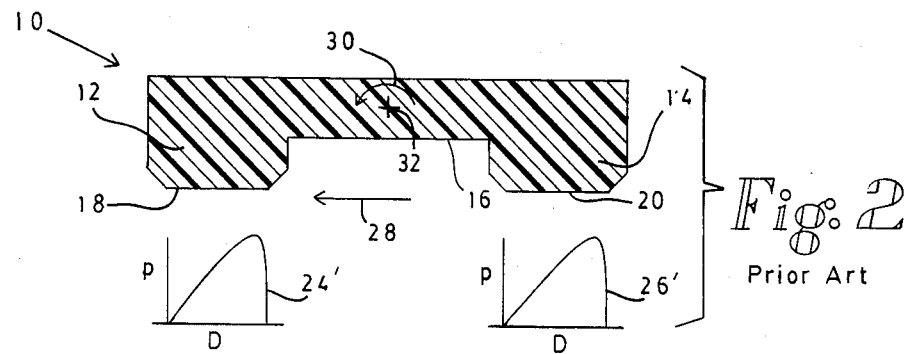
FIG. 2 is a cross-sectional drawing of a typical slider of the prior art showing the pressure distribution transversly across each of the rails during slider access movement or skewed operation.

Referring now to FIG. 2, the effect is shown of either accessing of the head across the recording medium in a direction indicated by the arrow 28 or an equivalent skew angle of the slider head. Either of these conditions significantly alter the pressure profile across each of the rails. When accessing is in the direction as indicated, the pressure distribution under air bearing rail 18 becomes that shown by the profile 24', with a substantially identical pressure profile 26', under the air bearing rail 20. Such pressure profiles tend to cause the slider head 10 to roll as in the direction indicated by the arrow 30 about a center point 32 and to decrease in flying height.

Figure 3:
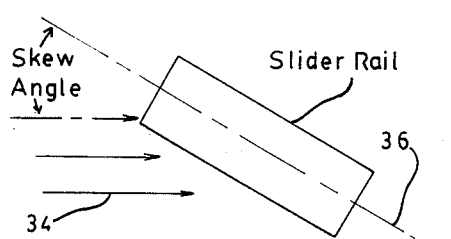
FIG. 3 is a drawing illustrating skew angle as applied to a magnetic head slider assembly, i.e., the included angle between the direction of disk velocity and the longitudinal axis of the slider.

Referring to FIG. 3, the skew angle of the slider head with respect to the direction of recording media rotation is illustrated, with the direction of rotation (and therefore the air flow) indicated by the arrows 34. The angle between this direction 34 and the longitudinal axis of the slider head 36 is defined as the skew angle. Since the skew angle can be of a positive or negative sense, a sign convention is adopted. In discussions that follow, the skew angle shown in FIG. 3 is defined to be negative. It may be seen from this figure that air pressures produced between the bearing surfaces will create a non-uniform pressure profile similar to that shown in FIG. 2 and, therefore, the slider head will tend to roll and decrease its flying height as described above.

Figure 4:
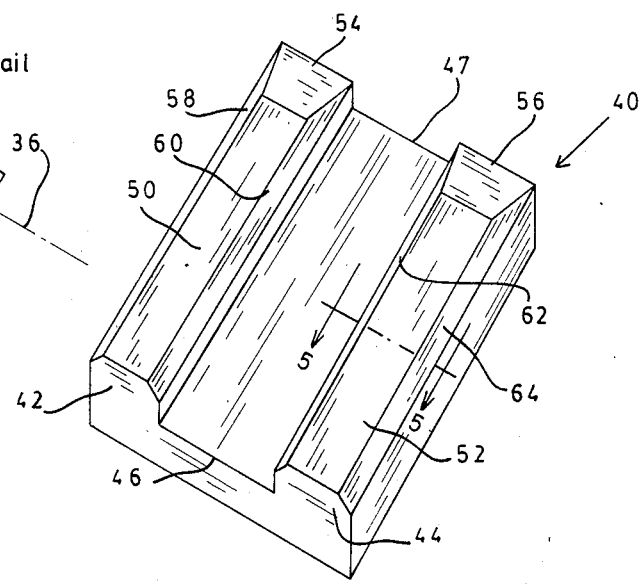
FIG. 4 is an isometric view showing the bottom of one embodiment of a slider of the present invention.

An isometric view of a slider head designed to substantially overcome the problems associated with access velocity and skew angle is shown in FIG. 4. This slider head assembly is indicated generally at 40. In this embodiment of the invention, there are a pair of parallel rails 42, 44 separated by a deeply recessed area 46 in a substantially conventional manner. The purpose of the recess is to keep that part of the slider from providing air bearing support and allows for low flying heights when low or moderate load forces are applied to the slider. Each of the rails 42, 44 are formed with air bearing surfaces 50, 52, respectively, with the forward end of these surfaces 54, 56 tapered whereby air entering between the bearing surfaces 50, 52 and the moving recording media causes the slider head to lift from the surface of the recording media. The function of these components is substantially like that known with slider heads of the prior art.

The construction of a slider head 40 deviates substantially from that taught by the prior art along each of the longitudinal edges of the rails 42, 44. In the embodiment shown in FIGS. 4 through 7, these longitudinal edges are provided with transverse pressurization contours (TPC) 58, 60, 62, 64. The purpose of these transverse pressurization contours will be described in more detail hereinafter. However, briefly they provide a pressurization region across one side edge and a depressurization region across the opposite side edge whereby the pressure distribution across the air bearing surfaces 50, 52 is substantially unaltered during significant skew angle operation and/or rapid access velocity of the slider head. Thus, the pressure distribution across the air bearings is substantially symmetrical (see FIG. 5) rather than being non-symmetrical as shown in FIG. 2. Accordingly, the slider head experiences substantially uniform flying height and reduced roll, if any.

Figure 5:
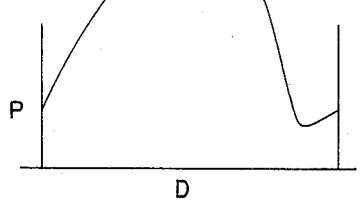
FIG. 5 is a transverse cross sectional view of one rail of the embodiment of the present invention shown in FIG. 4 and illustrating the transverse pressure profile as developed with this slider construction.

A cross section of one of the rails (44) of the present invention is shown in FIG. 5. This cross section is taken at 5—5 of FIG. 4. In this embodiment it may be seen that the transverse pressurization contours are very small straight tapers, having an angle A, which angle is normally no more than two degrees. Typically, when the angle on the taper section 56 at the forward end of the rail is approximately one degree, the angle A can have a value of approximately 0.5 to 1.0 degree. A typical total width of a rail is about 0.09 cm, and the width of each TPC is about 0.013 cm. Accordingly, about ⅓ of the bottom of a rail is occupied by the two TPC's of that rail.

Using this FIG. 5 as a reference, if the relative motion referenced to the rail 44 between the rail 44 and a recording medium (not shown) has a velocity vector indicated by the arrow 66, the transverse pressurization contour 62 becomes a pressurization element and the contour 64 becomes an expansion contour to thereby produce a substantially symmetrical pressure distribution transversely across the rail 44 and thus the air bearing surface 52 as shown. In a like manner, the transverse pressurization contours of the second rail (not shown) provide a similar adjustment of the transverse pressure distribution, and thus the slider head is stabilized against any significant roll or flying height change created during skewed operation or accessing movement of the slider head.

Figure 6:
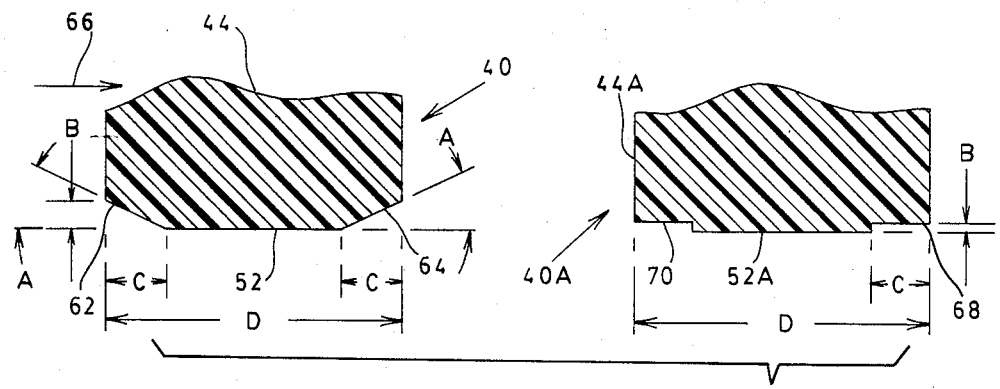
FIG. 6 is a cross sectional view of one rail of another embodiment of the present invention.

Another embodiment of the present invention is illustrated in FIG. 6. As in FIG. 5, only one rail is illustrated. In this embodiment the rail 44A, and air bearing surface 52A, is provided with notched recesses 68, 70. These notches have a very small depth B which perform a similar function to the tapered surfaces 62, 64, illustrated in FIG. 5.

Figure 7:
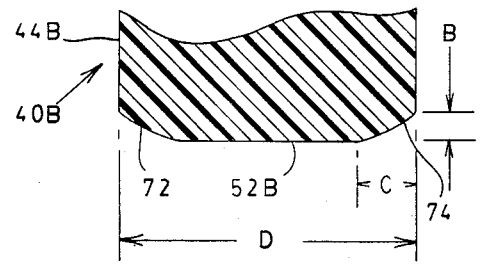
FIG. 7 is a cross sectional view of one rail of a further embodiment of the present invention.

Still another embodiment of the present invention is illustrated with the rail 44B (of a pair of rails) of FIG. 7. In this embodiment, the rail 44B is modified along the transverse edges with substantially cylindrical edge contours 72, 74. These contours provide substantially the same function as the tapers of FIG. 5 and the notches of FIG. 6.

Other configurations of the TPC surfaces providing for pressurization and expansion are suitable for the present invention. The precise surface could be given analytically (e.g., parabolic) or it could be described numerically point by point. Because of manufacturing considerations, however, the simple surface contours are preferred.

It will be apparent upon a consideration of FIGS. 5 through 7 that each embodiment of the transverse pressurization contours exhibits an "average angle" with respect to the air bearing surfaces. This average angle is determined by the slope between the intercepts of the contour with the sides and faces of the rails, and this slope is established by dividing the height B and the width C illustrated in these figures. In the case of the linear taper (FIG. 5), the angle of the taper is the average angle.

It may be seen that the TPC surfaces in FIG. 4 through 7 occupy only a portion of the total width of each rail. The width of each TPC is designated as C, while the depth at the edge is designated as B. In order for the rail to function as an air bearing surface, a substantial portion thereof should be flat. For this reason, the total portion of the width D, utilized by the two TPC's (2C) is of the order of 25 to 45%. Typically, for example, a rail is about 0.089 cm wide. If each TPC taper is 0.013 cm wide, the center flat portion is 0.063 cm. Under these conditions, the two TPC's occupy about 29% of the total width. Using these same figures, and a depth of the straight taper (in FIG. 4) as 1.8 microns, the taper angle is 0.8 degrees. A range of about ½ to 2 degrees will provide proper pressurization and expansion for the TPC contours.

The embodiment illustrated in FIGS. 4 and 5 is perhaps the preferred embodiment from the standpoint of manufacture. It is present practice to produce the slopes at the forward end of each of the rails using a lapping procedure wherein the slider head is set at the proper angle with respect to an appropriate abrasive surface, and that slope produced by creating a relative movement therebetween. The small angles of the slopes of the transverse pressurization contours can be produced in a similar manner without adding substantially to the cost of construction of the improved slider head.

The present invention has been described to this point as being applicable to a slider head having a pair of parallel rails as illustrated in FIG. 4. The same improvement can be applied to a three rail slider head such as that illustrated in the aforementioned U.S. Pat. No. 3,823,416. If the central rail of a three rail slider head is very narrow, there is substantially no air bearing surface provided and, therefore, the transverse pressurization contours will not be required along this central rail. However, if the central rail has an appreciable width and does provide a substantial portion of the air bearing surface, the application of transverse pressurization contours to this central rail will provide further improvement in the operation of the slider head as it is skewed or moves with respect to the recording medium.

Figure 11:
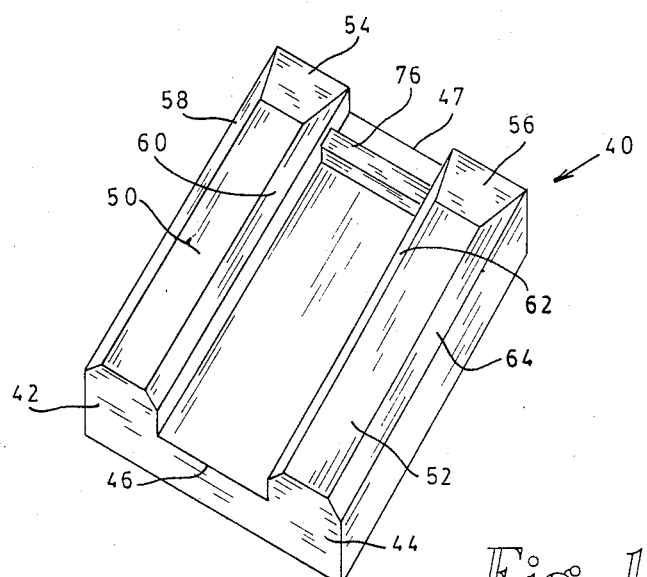
FIG. 11 is an isometric view showing the bottom of another slider employing the present invention.

The present invention is also applicable to a slider head of the type shown in U.S. Pat. No. 4,218,715. Such an embodiment is illustrated in FIG. 11. This embodiment is like that of FIG. 4 with the addition of a crossrail 76 joining rails 42, 44 near the forward end 47 of the slider head assembly.

A typical recording medium may have certain surface irregularities caused during the formation thereof or through previous usage. This involves certain raised asperities or other localized non-flat regions. Since the slider head of the present invention has reduced roll during its operation, there is less likelihood that physical contact occurs between the slider head and the recording medium while the recording medium is in motion. For this reason, even these imperfections produce less wear on either the recording medium or the sliding head, and thus the slider head has a longer life in a recording machine.

Other advantages accrue to the use of the present invention in machines of this type. Since the flying height and roll are less affected by the skew angle and the accessing velocity, a wider range of skew angles can be accommodated. This improvement will allow the use of a shorter radius rotary actuator for the slider head, and thus allow a more compact packaging of the disk drive. Furthermore, the higher accessing velocities which can be utilized with this slider head will provide for increased average data transfer rates between the magnetic head and the recording surface. In addition, the use of the transverse pressurization contours will produce a faster lift off of the slider head as the disk begins to rotate when the slider head is in a skewed position than would be the case for a slider head without such transverse pressurization contours. This also will reduce the wear of the surfaces and thus prolong the life of any of the components of the unit.

The tapered transverse pressurization contours such as illustrated in FIGS. 4 and 5 are not to be confused with the side chamfers such as shown in FIGS. 1 and 2. As stated above, the extreme chamfers shown in FIGS. 1 and 2 are to control chipping of the edges during start and stop operations, and to accurately control the width of the air bearing rails. Such side chamfers have a steep angle, typically of about 45 degrees and provide essentially no air bearing effect upon the rails. It should be understood that such side chamfers can be utilized in conjunction with the present invention to provide the same advantages as the chamfers provide in slider heads of the prior art.

Although the present invention has been shown for sliders having flat bearing surfaces (e.g., 50 and 52 of FIG. 4), the transverse pressurization contours can be applied to air bearing surfaces having other contours. For example, if the air bearing surface has a cylindrical surface about an axis perpendicular to the length of the slider (such as shown in U.S. Pat. No. 4,285,019), it will also be appreciated by those versed in the art that the transverse pressurization contours as described herein can be applied to air bearing surfaces having that and other contours.

A computer analysis of the performance of the present invention has been made, contrasting that performance to a substantially identical slider head that does not employ the transverse pressurization contours. This comparison was performed using a computer code called AIRBEAR which is designed to study the performance of magnetic slider heads. The slider analyzed had an overall length and width of 0.41 cm and 0.30 cm, respectively. The front taper length was 0.038 cm and the front taper angle was 1 degree. A concentrated load force of 15 gm was applied at the center of the slider toward the disk. The disk rotational velocity was 3600 rpm. Typical of the results are shown in FIGS. 8 through 10.

Figure 8:
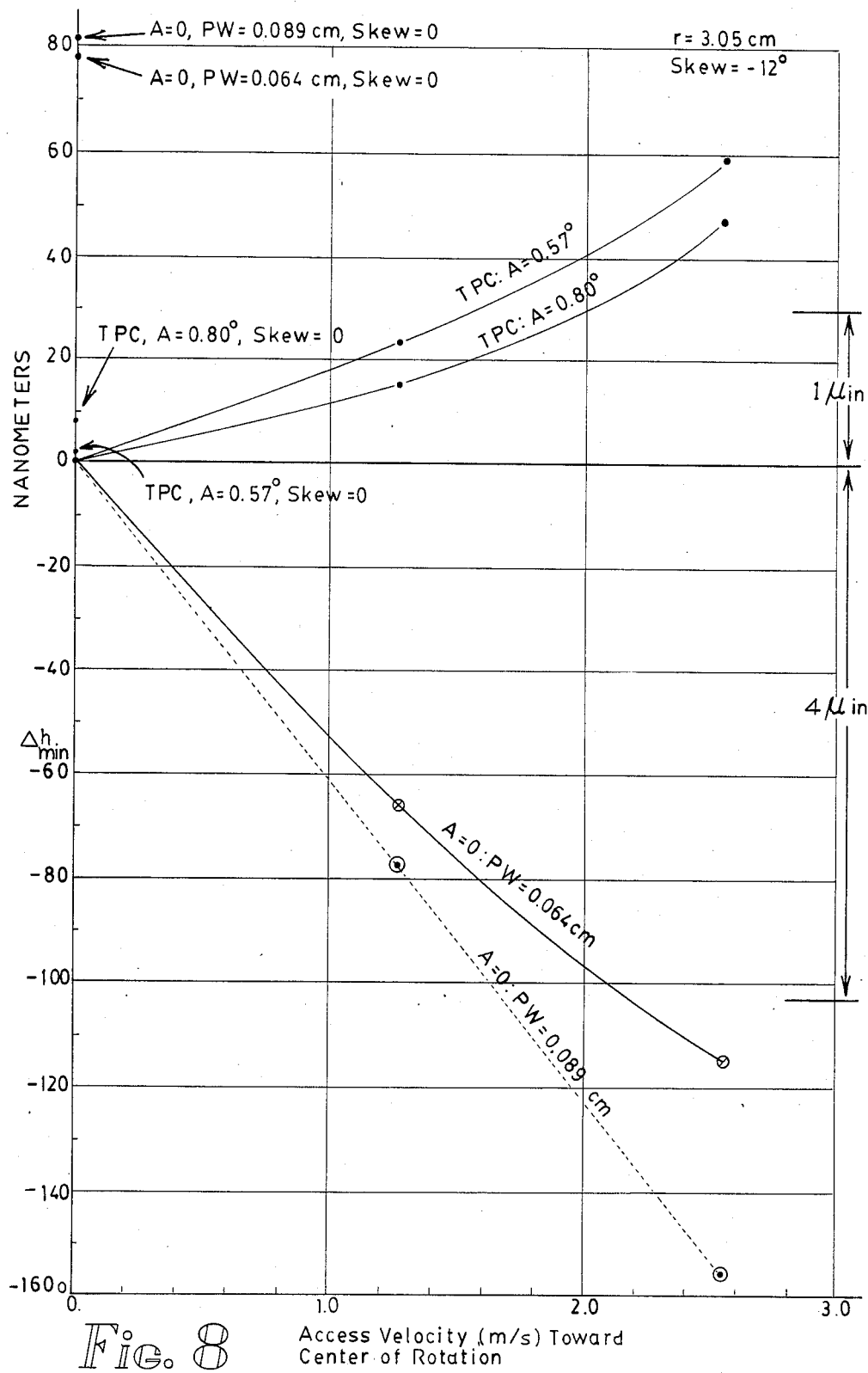
FIG. 8 is a computer simulation graphical presentation of performance of the present invention showing change of flying height as a function of access velocity.

Referring first to FIG. 8, shown therein is the relative response of flying height obtained as a function of the accessing velocity of the slider head. For this computation, the disk radius at the center of the slider head was set at 3.05 cm, and the slider head was set at a skew angle of $-12$ degrees. Two sets of curves are plotted in this figure. For the slider head having no transverse pressurization contours (angle A being 0) there are two curves for different widths (PW) of the slider rails. It may be seen that as the accessing velocity increases, the flying height decreases substantially, decreasing more than four microinches during access velocities of about 2.5 meters per second. The slider having transverse pressurization contours for the same access velocity has a flying height that actually increases approximately two microinches, with the lower height being provided with the taper angle of 0.80 degrees and the upper height achieved with a taper angle of 0.57 degrees. Plotted on the same figure at the left hand edge are flying heights for the two types of heads at zero skew angle relative to the flying heights at a skew angle of $-12$ degrees, showing that the head with the transverse pressurization contours having a taper angle of 0.8 degrees has a flying height change of less than one-half microinch, while the head with the pressurization contours of 0.57 degrees experiences a smaller flying height change.

Figure 9:
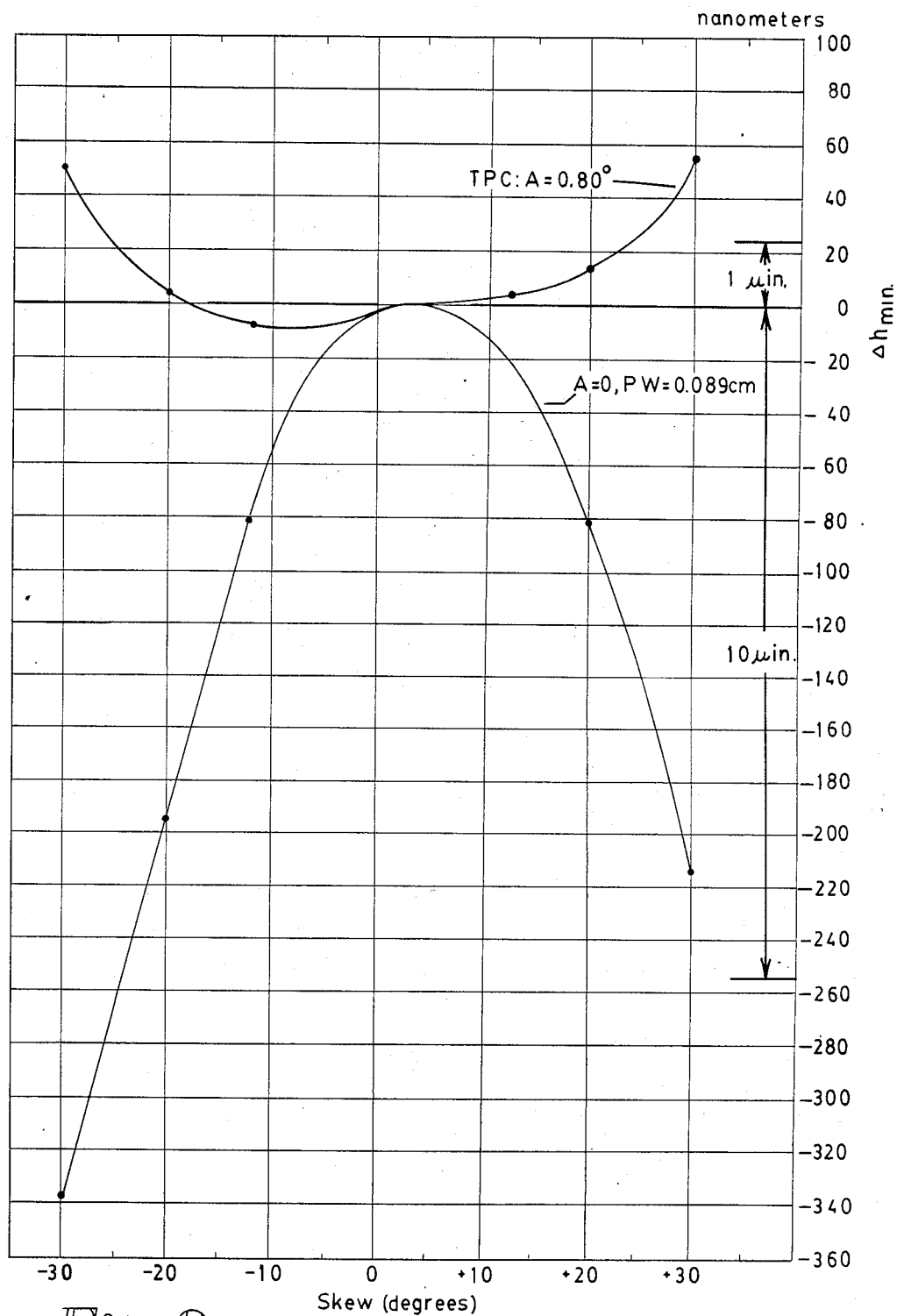
FIG. 9 is a computer simulation graphical presentation of performance of the present invention showing change of flying height as a function of skew angle.
Figure 10:
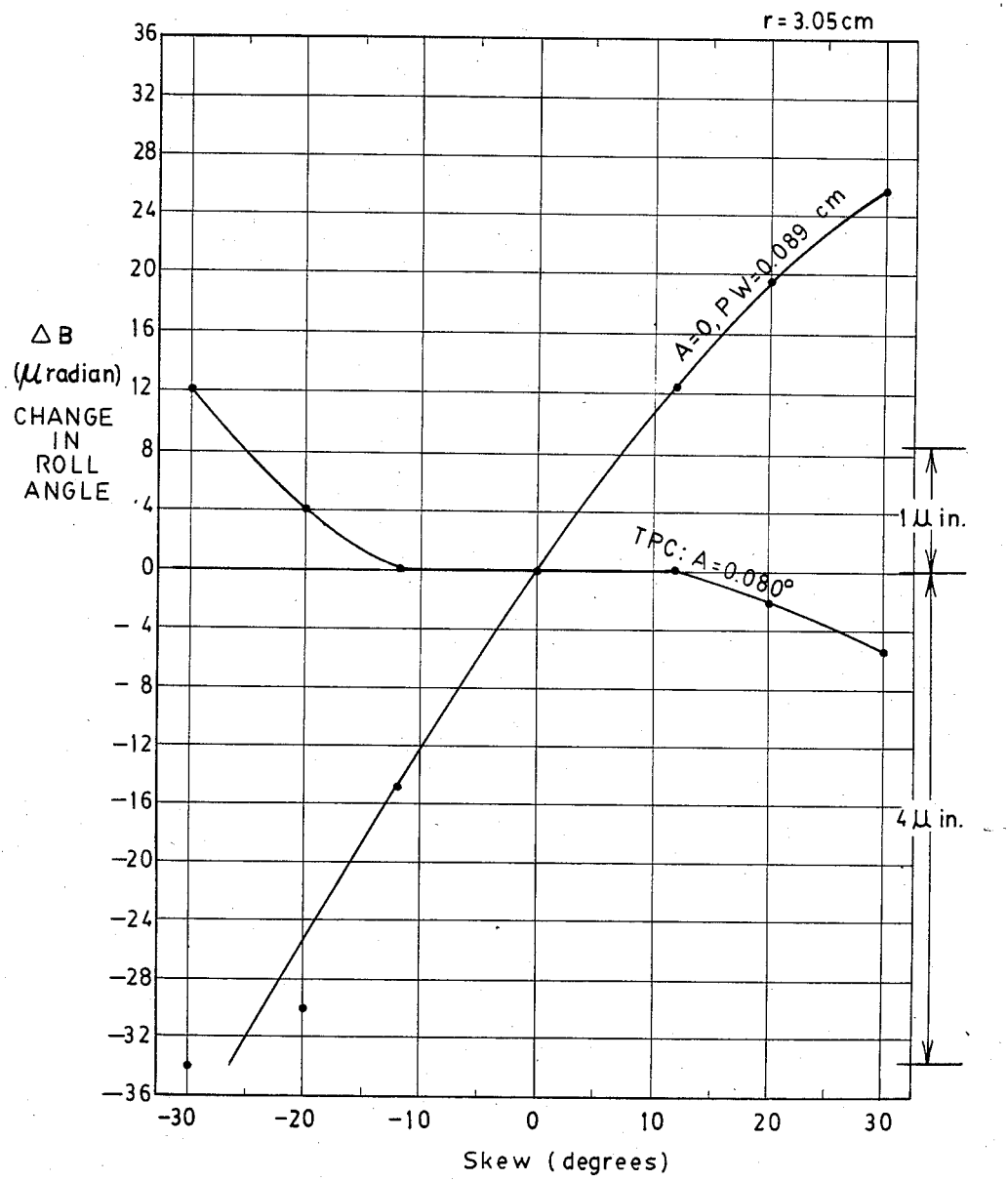
FIG. 10 is a computer simulation graphical presentation of performance of the present invention showing the effect of skew angle on the change in roll angle.

Referring now to FIG. 9, shown therein is the flying height performance, as a function of skew angle, of the present invention (embodiment of FIGS. 4 and 5), as contrasted to a comparable slider head without transverse pressurization contours. Depending on the orientation of the slider with respect to a radial line on the disk, the skew angle can be positive or negative. In the present description of the new invention, the skew angle as shown in FIG. 3 is taken to be in the negative sense.

The graphical presentation in FIG. 9 is for a slider head having rail widths of 0.089 cm. The width of each transverse pressurization contour (TPC) is 0.013 cm and the depth of each TPC is 1.8 micron. It may be seen that a slider head without a TPC on the edge of each rail moves toward the recording medium as the skew angle (either negative or positive) increases in magnitude. If the flying height at zero skew is too small, the head will "crash" (contact the disk) under these conditions of large skew angle. This can be a particular problem at smaller radii of the disk as there is relatively less air velocity closer to the center of disk rotation and the head flies at a closer spacing. In contrast, the TPC edges on the rails slightly increase the flying height, with a maximum increase of about 2 microinches over the skew angle range presented. However, the response over a rather wide range of skew angles is substantially flat, as shown compared with the prior art.

The effect upon the roll angle of the slider head of the present invention (embodiment of FIGS. 4 and 5) is illustrated in FIG. 10. This is a plot of the computed change in roll angle as a function of skew angle. As for the case of flying height, the present invention has esentially no change in roll angle over a substantial range of skew angles. Only at extreme skew angles is any roll encountered. In contrast, a slider head without the benefit of TPC's on the rails exhibits severe roll angle changes whenever the skew angle deviates from zero. Large roll angles degrade the stability of the air bearing and increase the likelihood that slider/disk contact may occur when off-design conditions are encountered.

From the foregoing, it will be apparent to one versed in the art that an improved magnetic slider head is achieved by adding transverse pressurization contours along each of the edges of the rails forming the air bearing surfaces of the head. These contours can be straight tapers having an angle approximating the value of the angle conventionally used at the forward ends of the rails to pressurize the air for formation of the air bearings. Other contour configurations are applicable that produce a converging region across one side edge and a diverging region across the other edge such that any air flow across the air bearing will experience a pressurization in the converging region and an expansion in the diverging region. This construction results in a performance wherein the effect of access velocity and skew angle have very little effect upon the air bearing performance of the slider head: the slider head is not driven toward the magnetic medium nor caused to roll as experienced with slider heads of the prior art. This improved performance substantially reduces the potential contact and wear between the slider head and the recording medium for all operating conditions. The preferred construction is accomplished with a minimum of change in the fabrication procedure for slider heads.

The transverse pressurization contours illustrated in FIGS. 4 through 7 and 11 are shown to be symmetrical (equal width and height) on each edge of each of the rails of a slider. Although this symmetry simplifies an analysis of performance of the slider, and perhaps provides a simplification of their manufacture, some applications of sliders may be best served by the use of nonsymmetric transverse pressurization contours Accordingly, the present invention embraces both symmetrical and non-symmetrical transverse pressurization contours.

Although only specific embodiments of the present invention are shown and described herein, the invention is not to be limited by these embodiments. Rather, the scope of the invention is to be defined by these descriptions taken together with the attached claims and their equivalents.

What is claimed is:

1. A slider assembly for supporting a magnetic transducer in relation to a moving magnetic record medium, comprising:
    a support structure having leading and trailing edges relative to the motion of said medium, and a longitudinal axis disposed along the length of said support structure from said leading edge to said trialing edge;
    at least one rail carried by said support structure defining a face toward said recording medium, said face being provided with a converging portion at said leading edge for pressurizing air between said face and said recording medium causing said slider assembly to fly at close proximity to said recording medium during moving of said recording medium; and
    wherein said rail is provided with transverse pressurization contours along each side edge of said face for producing pressurization in one of said contours and expansion in the second of said contours when air flow across said face has a substantially undirectional transverse component, said transverse pressurization contours having an average angle with respect to said face of about 0.5 to about 2 degrees.

2. The slider assembly of claim 1 wherein said support structure has a pair of rails, one along each edge thereof, each of said rails defining a face toward said recording medium, each of said faces of said rails being provided with a converging portion at said leading edge for pressurization of air between said faces and said recording medium whereby said faces fly at a close spacing from said recording medium when said recording medium is moving; and wherein each of said rails is provided with transverse pressurization contours along each side edge of said faces for producing pressurization of the air flow in one of said contours and expansion in the second of said contours of each of said rails when air flow across said faces has a substantially unidirectional transverse components, said transverse pressurization contours having an average angle with respect to said faces of about 0.5 to about 2 degrees.

3. The slider assembly of claim 2 wherein said converging portion of each of said faces of said rails at said leading edge is a linear taper, and each of said transverse pressurization contours along each side edge of said rails is a linear tape of said angle of about 0.5 to about 2 degrees.

4. The slider assembly of claim 2 wherein said converging portion of each of said faces of said rails at said leading edge is a linear taper, and each of said transverse pressurization contours along each side edge of said rails is a step having a height and width to establish said average angle of about 0.5 to about 2 degrees with respect to said faces.

5. The slider assembly of claim 2 wherein said converging portion of each of said faces of said rails at said leading edge is a linear taper, and each of and transverse pressurization contours along each side edge of said rails is a convex cylindrical surface having a height and width to establish said average angle of about 0.5 to 2 degrees with respect to said faces.

6. The slider assembly of claim 2 further comprising a cross rail connecting said side rail proximate said leading edge, said cross rail and portions of said side rails toward said trailing edge, defining a recessed section open at said trailing edge, said recessed section developing a subambient pressure.

7. The slider assembly of claim 1 wherein said support structure has a pair of side rails extending along each edge thereof, and a narrow central rail extending from said leading edge to said trailing edge for such supporting of such magnetic transducer at said trailing edge, each of said side and central rails defining a face toward said recording medium, each of said faces being provided at said leading edge with a linear taper for pressurization of air between said faces and said recording medium whereby said faces fly at a close spacing to said recording medium when said recording medium is moving; and wherein each of said side rails is provided with transverse pressurization contours along each edge of said faces of said side rails for producing pressurization in one of said contours of each of said rails and expansion in the other of said contours of each of said rails when air flow across said faces has a substantially unidirectional transverse component, said transverse pressurization contours each having an average angle with respect to said faces of about 0.5 to about 2 degrees.

8. The slider assembly of claim 7 wherein each of said transverse pressurization contours is a linear taper having said angle of about 0.5 to about 2 degrees, and occupies from about 12.5 to about 22.5% of said faces.

9. The slider assembly of claim 1 wherein said transverse pressurization contour along one edge of said rail is substantially symmetrical to said transverse pressurization contour along the other edge of said rail.

10. The slider assembly for supporting a magnetic transducer in relation to a rotatable disk magnetic recording medium, said slider assembly adapted for rotary access across said disk thereby causing said slider to be oriented at various skew angles with respect to the direction of rotation of said disk, said slider assembly exhibiting substantially improved resistance to change in flying height and roll angle during skewed operation and/or said access, comprising:
   a support structure having a length and width, leading edge and a trailing edge relative to said rotary motion of said disk, and a longitudinal axis disposed along said length from said leading edge to said trailing edge, with angles between said longitudinal axis and said direction of said rotation of said disk defining said skew angles;
   a pair of rails carried by said support structure symmetrically located from said longitudinal axis at opposite edges of said support structure, said rails defining a deep recess therebetween extending from said leading edge and said trailing edge, each of said rails having an exposed substantially flat face oriented toward said disk, each of said faces of said rails being provided with a converging linear taper having a selected angle of about ½ to 2 degrees at said leading edge for pressurization of air between said faces and said disk when said disk is rotating to cause said faces to fly at a close spacing to said disk; and
   wherein said rails are provided with a symmetrical transverse pressurization contour having a linear taper of a selected angle of about ½ to 2 degrees along each edge of said faces for producing pressurization of air flow in one of said tapers of each of said rails and expansion of said air flow in the other of said tapers of each of said rails when said slider is operated at a skew angle and/or radially accessed across said disk.

11. A slider assembly for supporting a magnetic transducer in relation to a moving magnetic recording medium, comprising:
   a support structure having leading and trailing edges relative to the motion of said recording medium, and a longitudinal axis disposed along the length of said support structure from said leading edge to said trailing edge;
   a pair of rails carried by said support structure, one along each edge thereof, each of said rails defining a face toward said recording medium, said faces each being provided with a linear taper of a selected angle at said leading edge for pressurization of air between said faces and said recording medium whereby said faces fly at close proximity to said recording medium when said recording medium is moving, each of said faces being further provided with transverse step contours along each side edge of said faces for producing pressurization of air flow in one of said step contours and expansion in the second of said step contours when air flow across said faces has a substantially unidirectional transverse component; and
   wherein said step contours have a height and width at said edges to define an average angle with respect to said faces of about 0.5 to about 2 degrees.

12. A slider assembly for supporting a magnetic transducer in relation to a moving magnetic recording medium, comprising:
   a support structure having leading and trailing edges relative to the motion of such medium, and a longitudinal axis disposed along the length of said support structure from said leading edge to said trailing edge;
   a pair of rails carried by said support structure one along each edge thereof, each of said rails defining a face toward said recording medium, said faces each being provided with a linear taper at said leading edge for pressurization of air between said faces and said recording medium whereby said faces fly at close proximity to said recording medium when said recording medium is moving; and
   wherein said faces are each further provided with transverse pressurization contours along each side edge of said faces for producing pressurization in one of said contours and expansion in the second of said contours when air flow across said faces has a substantially unidirectional transverse component, wherein each of said contours is a convex cylindrical surface having a height and width at said edges to define an average angle with respect to said faces of about 0.5 to about 2 degrees.

13. A slider assembly for supporting a magnetic transducer in relation to a rotating magnetic recording medium, said slider assembly exhibiting substantially improved resistance to change in flying height and roll during skewed operation and/or during access across said medium comprising:
   a support structure having a leading edge and a trailing edge relative to rotary motion of said recording medium and a longitudinal axis disposed along the length of said support structure from said leading edge of said trailing edge;
   a pair of rails carried by said support structure parallel to asid longitudinal axis at each edge of said support structure, said rails defining a deep recess from said leading edge to said trailing edge, each of said rails defining an exposed face toward said recording medium, each of said faces of said rails being provided with a converging linear taper portion at said leading edge for pressurization of air between said faces and said recording medium when said recording medium is moving to cause said faces to fly at a close spacing from said recording medium; and
   wherein each of said rails is provided with a transverse pressurization contour along each edge of each of said faces for producing pressurization of air flow in one of said contours on each of said rails and expansion of said air flow in the other of said contours on each of said rails when said slider is skewed and/or accessed across said medium, and thereby provide said resistance to change in flying height and roll, said transverse pressurization contours, having an average angle with respect to said faces of about 0.5 to about 2 degrees.

14. The slider assembly of claim 13 wherein each of said rails has a width of about 0.089 cm, said converging portion of said faces is a linear taper of about 1 degree, and each of said transverse pressurization contours has a width of about 0.013 cm and a selected angle of about 0.8 degrees.

15. The slider assembly of claim 13 wherein said converging portion of said faces is a linear taper of about 1 degree, each of said rails is about 0.089 wide, and each of said transverse pressurization contours are symmetrical steps on each of said rails, each of said steps having a width of about 0.013 cm and a depth of about 1.8 microns.

16. The slider assembly of claim 13 wherein said transverse pressurization contour along each edge of said rails at said faces is a convex cylindrical surface having a center of rotation parallel to said longitudinal axis.

17. A slider assembly for supporting a magnetic transducer in relation to a moving magnetic recording medium, comprising:
a support structure having leading and trailing edges relative to the motion of such medium, and a longitudinal axis disposed along the length of said support structure from said leading edge to said trailing edge;
a pair of rails carried by said support structure, one along each edge thereof, each of said rails defining a face toward said recording medium, said faces each being provided with a linear taper at said leading edge for pressurization of air between said faces and said recording medium whereby said faces fly at close proximity to said recording medium when said recoridng medium is moving; and
wherein said faces are each further provided with transverse pressurization contours along each side edge of said faces for producing pressurization in one of said contours and expansion in the second of said contours when air flow across said faces has a substantially undirectional transverse component, said contours being linear tapers having an angle of about 0.5 to about 2 degrees with respect to said faces.

18. The slider assembly of claim 17 wherein said faces of said rails define convex cylindrical surfaces having an axis perpendicular to said longitudinal axis of said support structure and substantially parallel to said recording medium.

19. The slider assembly of claim 17 wherein said transverse pressurization contours in total occupy from about 25 to about 45% of said face of each rail.

20. The slider assembly of claim 17 wherein said rail has a width of about 0.089 cm, said linear taper at said leading edge has an angle of 1 degree, each said linear taper transverse pressurization contour has a width of 0.013 cm, and an angle of 0.8 degrees.

* * * * *

UNITED STATES PATENT AND TRADEMARK OFFICE
CERTIFICATE OF CORRECTION

PATENT NO. : B1 4,673,996

DATED : February 4, 1997

INVENTOR(S) : James W. White

It is certified that error appears in the above-identified patent and that said Letters Patent is hereby corrected as shown below:

Claim 28, column 4, line 12, delete "28" and insert --27--.

Signed and Sealed this

Fourteenth Day of July, 1998

Attest:

BRUCE LEHMAN

Attesting Officer

Commissioner of Patents and Trademarks

REEXAMINATION CERTIFICATE (3117th)
United States Patent [19]
White

[11] B1 4,673,996
[45] Certificate Issued Feb. 4, 1997

[54] MAGNETIC HEAD AIR BEARING SLIDER ASSEMBLY UTILIZING TRANSVERSE PRESSURIZATION CONTOURS

[76] Inventor: James W. White, 1816 Chicadee Dr., Knoxville, Tenn. 37919

Reexamination Requests:
No. 90/003,527, Aug. 10, 1994
No. 90/003,734, Feb. 21, 1995
No. 90/003,979, Sep. 28, 1995

Reexamination Certificate for:
Patent No.: 4,673,996
Issued: Jun. 16, 1987
Appl. No.: 728,311
Filed: Apr. 29, 1985

[51] Int. Cl.⁶ .................................................. G11B 5/60
[52] U.S. Cl. .................................................. 360/103
[58] Field of Search .................................................. 360/103

[56] References Cited

U.S. PATENT DOCUMENTS

| | | | |
|---|---|---|---|
| 3,823,416 | 7/1974 | Warner | 360/122 |
| 3,855,625 | 12/1974 | Garnier et al. | 360/103 |
| 4,285,019 | 8/1981 | Scott et al. | 360/103 |
| 4,420,780 | 12/1983 | Deckert | 360/103 |
| 4,475,135 | 10/1984 | Warner et al. | 360/103 |
| 4,636,894 | 1/1987 | Mo | 360/103 |

FOREIGN PATENT DOCUMENTS

| | | |
|---|---|---|
| 57-122063 | 1/1981 | Japan. |
| 57-18171 | 1/1982 | Japan. |
| 57-20963 | 2/1982 | Japan. |
| 59-72679 | 4/1984 | Japan. |

OTHER PUBLICATIONS

Fuller, Dudley D., *Theory And Practice Of Lubrication For Engineers*, (1984).
Gross, William A., et al., *Fluid Film Lubrication*, (1980).

*Primary Examiner*—R. S. Tupper

[57] ABSTRACT

A slider head assembly for flying a magnetic head at very low clearances on a fluid film over a moving recording media. This improved slider head assembly has at least one air bearing surface that flies above the recording medium due to pressurization of air under that bearing surface as the recording medium is rotated. The air bearing surface is provided with a transverse pressurization contour (TPC) along each side edge of the bearing surface such that any air flow from the side of the slider assembly, due to skew angle operation and/or access velocity, produces pressurization adjacent to one side edge and expansion adjacent to the other side edge of each air bearing surface. The pressure distribution across each air bearing surface is substantially symmetrical from side to side. This construction makes the slider assembly flying height and roll angle essentially insensitive to skew angle and/or access velocity. One of the embodiments utilizes a TPC having a linear taper of generally less than one degree. This embodiment is produced with a minor modification to conventional fabrication techniques.

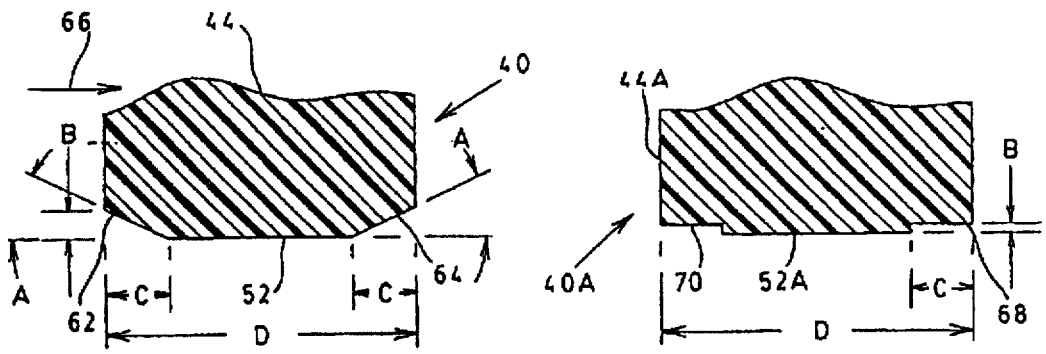

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Figure 12:
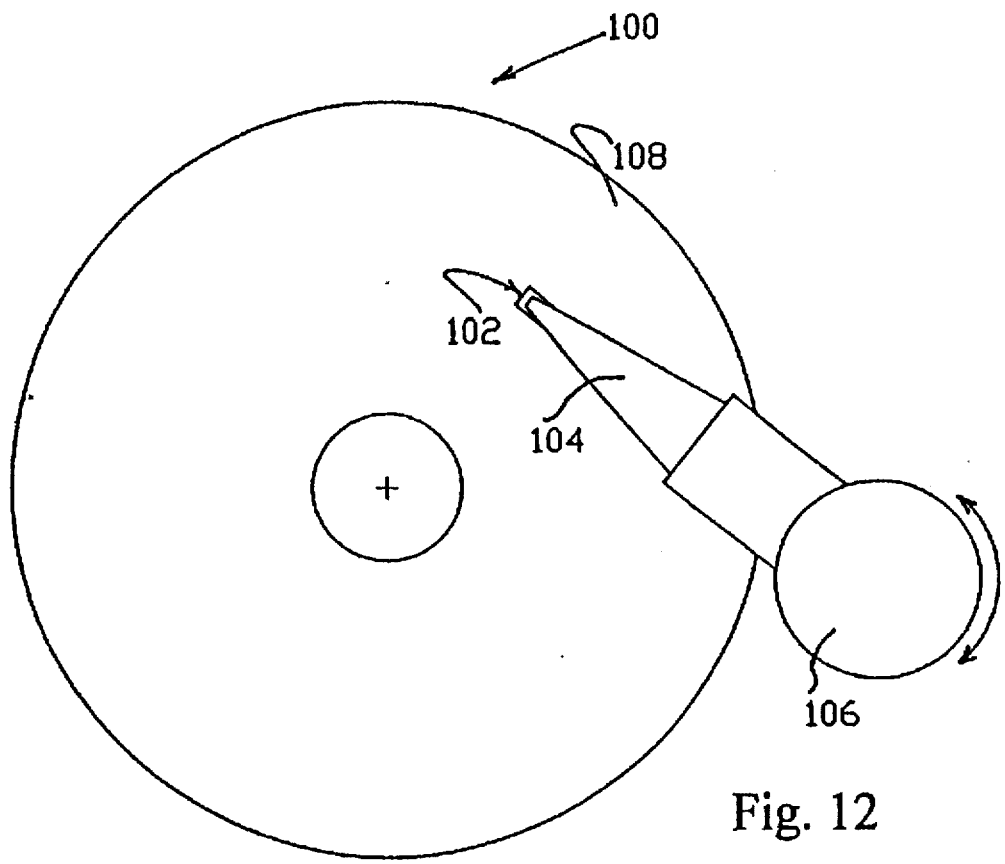

Column 1, between lines 48 and 49, new paragraph:

*A typical magnetic recording system 100 is illustrated schematically in FIG. 12. The system 100 includes a slider 102 attached to an arm 104 which in turn is rotated by a rotary acutator 106. Arm 104 holds slider 102 over a recording medium 108.*

Column 4, between lines 23 and 24, new paragraph:

*FIG. 12 is a schematic view of a magnetic recording system having an actuator and an arm which holds a slider over a recording medium according to the invention.*

Column 6, between lines 47 and 48, new paragraph:

*As illustrated in FIGS. 4 and 11, the transverse pressurization contours extend the full length of the rails. In FIGS. 4 and 11, the width and depth of the traverse pressurization contours are constant along the length of the rails except at the leading edge where the width and depth dimensions of the transverse pressurization contours differ from the width and depth dimensions along the rest of the rails due to the intersection of the transverse pressurization contours with the front taper sections.*

THE DRAWING FIGURES HAVE BEEN CHANGED AS FOLLOWS:

Add new FIG. 12.

AS A RESULT OF REEXAMINATION, IT HAS BEEN DETERMINED THAT:

The patentability of claim 11 is confirmed.

Claims 2, 4, 10, 12 and 17-20 are cancelled.

Claims 1, 3, 5-9 and 13 are determined to be patentable as amended.

Claims 14-16, dependent on an amended claim, are determined to be patentable.

New claims 21-123 are added and determined to be patentable.

1. A slider assembly for supporting a magnetic transducer in relation to a moving magnetic record medium, comprising:

a support structure having leading and trailing edges relative to the motion of said medium, and a longitudinal axis disposed along the length of said support structure from said leading edge to said [trialing] *trailing* edge;

[at least one rail] *a pair of rails* carried by said support structure, *one along each edge thereof, each of said rails defining a face toward said recording medium, each of* said [face] *faces of said rails* being provided with a converging portion at said leading edge for pressurizing air between said [face] *faces* and said recording medium causing said *faces of said* slider assembly to fly at *a* close [proximity to] *spacing from* said recording medium [during moving of] *when* said recording medium[; and] *is moving;* wherein *each of* said [rail] *rails* is provided with transverse pressurization contours along each side edge of said [face] *faces* for producing pressurization *of the air flow* in one of said contours and expansion in the second of said contours *of each of said rails* when air flow across said [face] *faces* has a substantially [undirectional] *unidirectional* transverse component, said transverse pressurization contours having an average angle with respect to said [face] *faces* of about 0.5 to about 2 degrees; *and*

*wherein said converging portion of each of said faces of said rails at said leading edge is a linear taper, and each of said transverse pressurization contours along each side edge of said rails is a step having a height and width to establish said average angle of about 0.5 to about 2 degrees with respect to said faces.*

3. The slider assembly of claim [2] *52* wherein said converging portion of each of said faces of said rails at said leading edge is a linear taper, and each of said transverse pressurization contours along each side edge of said rails is a linear [tape of said angle] *taper having an angle* of about 0.5 to about 2 degrees.

5. The slider assembly of claim [2] *52* wherein said converging portion of each of said faces of said rails at said leading edge is a linear taper, and each of said transverse pressurization contours along each side edge of said rails is a convex cylindrical surface having a height and width to establish said average angle of about 0.5 to 2 degrees with respect to said faces.

6. The slider assembly of claim [2] *1* further comprising a cross rail connecting said [side rail] *rails* proximate said leading edge, said cross rail and portions of said side rails toward said trailing edge, defining a recessed section open at said trailing edge, said recessed section developing a subambient pressure.

7. The slider assembly of claim 1 wherein said support structure has [a pair of side rails extending along each edge thereof, and] a narrow central rail *disposed between said pair of rails and* extending from said leading edge to said trailing edge for such supporting of such magnetic transducer at said trailing edge, [each of] said [side] *pair of rails and said* central [rails] *rail each* defining a face toward said recording medium, each of said faces being provided at said leading edge with a linear taper for pressurization of air between said faces and said recording medium whereby said faces fly at a close spacing to said recording medium when said recording medium is moving; and wherein each of said [side] rails is provided with transverse pressurization contours along each edge of said faces of said side rails for producing pressurization in one of said contours of each of said rails and expansion in the other of said contours of each of said rails when air flow across said faces has a substantially unidirectional transverse component, said transverse pressurization contours each having an average angle with respect to said faces of about 0.5 to about 2 degrees.

8. The slider assembly of claim [7] 52 wherein each of said transverse pressurization contours is a linear taper having said angle of about 0.5 to about 2 degrees, and occupies from about 12.5 to about 22.5% of said faces.

9. The slider assembly of claim 1 wherein said transverse pressurization contour along one edge of *one of* said [rail] *rails* is substantially symmetrical to said transverse pressurization contour along the other edge of said rail.

13. A slider assembly for supporting a magnetic transducer in relation to a rotating magnetic recording medium, said slider assembly exhibiting substantially improved resistance to change in flying height and roll during skewed operation and/or during access across said medium comprising:

a support structure having a leading edge and a trailing edge relative to rotary motion of said recording medium and a longitudinal axis disposed along the length of said support structure from said leading edge of said trailing edge;

a pair of *side* rails carried by said support structure parallel to [asid] *said* longitudinal axis at each edge of said support structure, said rails defining a deep recess from said leading edge to said trailing edge, each of said rails defining an exposed face toward said recording medium, each of said faces of said rails being provided with a converging linear taper portion at said leading edge for pressurization of air between said faces and said recording medium when said recording medium is moving to cause said faces to fly at a close spacing from said recording medium; and wherein each of said rails is provided with a transverse pressurization contour along each edge of each of said faces for producing pressurization of air flow in one of said contours on each of said rails and expansion of said air flow in the other of said contours on each of said rails when said slider is skewed and/or accessed across said medium, and thereby provide said resistance to change in flying height and roll, said transverse pressurization contours, having an average angle with respect to said faces of about 0.5 to 2 degrees; *and*

*further comprising a cross rail connecting said side rails proximate said leading edge, said cross rail and portions of said side rails toward said trailing edge, defining a recessed section open at said trailing edge, said recessed section developing a subambient pressure.*

21. *The slider assembly of claim 1, wherein said transverse pressurization contours extend the full length of said rail.*

22. *The slider assembly of claim 1, wherein said transverse pressurization contours are substantially uniform in width along at least a portion of said rail.*

23. *The slider assembly of claim 1, wherein the width of at least one of said transverse pressurization contours is constant along the length of the rail except at the leading edge where the width varies upon intersection with the converging portion.*

24. *The slider assembly of claim 1, wherein said transverse pressurization contours are substantially uniform in depth along at least a portion of said rail.*

25. *The slider assembly of claim 1, wherein the depth of at least one of said transverse pressurization contours is constant along the length of the rail except at the leading edge wherein the depth varies upon intersection with the converging portion.*

26. *The slider assembly of claim 1, wherein said transverse pressurization contour along one edge of one of said rails is substantially non-symmetrical to said transverse pressurization contour along the other edge of said rail.*

27. *The slider assembly of claim 1, wherein said support structure is included in a magnetic recording system having an actuator and an arm, wherein said support structure may be positioned over said recording medium by movement of said arm by said actuator.*

28. *The slider assembly of claim 28, wherein said actuator is a rotary actuator.*

29. *The slider assembly of claim 1, wherein said transverse pressurization contours occupy in total from about 25% to about 45% of the faces of each of said rails.*

30. *The slider assembly of claim 11, wherein said transverse pressurization contours extend the full length of said rail.*

31. *The slider assembly of claim 11, wherein said transverse pressurization contours are substantially uniform in width along at least a portion of said rail.*

32. *The slider assembly of claim 11, wherein the width of at least one of said transverse pressurization contours is constant along the length of the rail except at the leading edge wherein the width varies upon intersection with the linear taper at said leading edge.*

33. *The slider assembly of claim 11, wherein said transverse pressurization contours are substantially uniform in depth along at least a portion of said rail.*

34. *The slider assembly of claim 11, wherein the depth of at least one of said transverse pressurization contours is constant along the length of the rail except at the leading edge where the depth varies upon intersection with the linear taper at said leading edge.*

35. *The slider assembly of claim 11, wherein said transverse pressurization contour along one edge of one of said rails is substantially symmetrical to said transverse pressurization contour along the other edge of said rail.*

36. *The slider assembly of claim 11, wherein said transverse pressurization contour along one edge of one of said rails is substantially non-symmetrical to said transverse pressurization contour along the other edge of said rail.*

37. *The slider assembly of claim 11, wherein said support structure is included in a magnetic recording system having an actuator and an arm, wherein said support structure may be positioned over said recording medium by movement of said arm by said actuator.*

38. *The slider assembly of claim 37, wherein said actuator is a rotary actuator.*

39. *The slider assembly of claim 11, wherein said transverse pressurization contours occupy from about 25% to about 45% of the faces of each of said rails.*

40. *The slider assembly of claim 39, further comprising a cross rail connecting said rails proximate said leading edge, said cross rail and portions of said rails toward said trailing edge, defining a recessed section open at said trailing edge, said recessed section developing a subambient pressure.*

41. *The slider asssembly of claim 13, wherein said transverse pressurization contours are linear tapers.*

42. *The slider assembly of claim 13, wherein said transverse pressurization contours are steps.*

43. *The slider assembly of claim 13, wherein said transverse pressurization contours are convex cylindrical surfaces.*

44. *The slider assembly of claim 13, wherein said transverse pressurization contours extend the full length of said rail.*

45. The slider assembly of claim 13, wherein said transverse pressurization contours are substantially uniform in width along at least a portion of said rail.

46. The slider assembly of claim 13, wherein the width of at least one of said transverse pressurization contours is constant along the length of the rail except at the leading edge where the width varies upon intersection with the converging linear taper portion.

47. The slider assembly of claim 13, wherein said transverse pressurization contours are substantially uniform in depth along at least a portion of said rail.

48. The slider assembly of claim 13, wherein the depth of at least one of said transverse pressurization contours is constant along the length of the rail except at the leading edge where the depth varies upon intersection with the converging portion.

49. The slider assembly of claim 13, wherein said transverse pressurization contour along one edge of one of said rails is substantially symmetrical to said transverse pressurization contour along the other edge of said rail.

50. The slider assembly of claim 13, wherein said transverse pressurization contour along one edge of one of said rails is substantially non-symmetrical to said transverse pressurization contour along the other edge of said rail.

51. The slider assembly of claim 13, wherein said support structure is included in a magnetic recording system having an actuator and an arm, wherein said support structure may be positioned over said recording medium by movement of said arm by said actuator.

52. The slider assembly of claim 51, wherein said actuator is a rotary acutator.

53. The slider assembly of claim 13, wherein said transverse pressurization contours occupy in total from about 25% to about 45% of the faces of each of said rails.

54. A slider assembly for supporting a magnetic transducer in relation to a moving magnetic recording medium, comprising:

a support structure having leading and trailing edges relative to the motion of said recording medium, and a longitudinal axis disposed along the length of said support structure from said leading edge to said trailing edge;

a pair of rails carried by said support structure, one along each edge thereof, each of said rails defining a face toward said recording medium, each of said faces of said rails being provided with a converging portion at said leading edge for pressurizing air between said faces and said recording medium causing said faces of said slider assembly to fly at a close spacing from said recording medium when said recording medium is moving;

wherein each of said rails is provided with transverse pressurization contours along each side edge of said faces for producing pressurization of the air flow in one of said contours and expansion in the second of said contours of each of said rails when air flow across said faces has a substantially unidirectional transverse component, said transverse pressurization contours having an average angle with respect to said faces of about 0.5 to about 2 degrees; and further comprising a cross rail connecting said rails proximate said leading edge, said cross rail and portions of said rails toward said trailing edge, defining a recessed section open at said trailing edge, said recessed section developing a subambient pressure.

55. The slider assembly of claim 54, wherein said transverse pressurization contours extend the full length of the rail.

56. The slider assembly of claim 54, wherein said transverse pressurization contours are substantially uniform in width along at least a portion of said rail.

57. The slider assembly of claim 54, wherein the width of at least one of said transverse pressurization contours is constant along the length of the rail except at the leading edge where the width varies upon intersection with the converging portion.

58. The slider assembly of claim 54, wherein said transverse pressurization contours are substantially uniform in depth along at least a portion of said rail.

59. The slider assembly of claim 54, wherein the depth of at least one of said transverse pressurization contours is constant along the length of the rail except at the leading edge where the depth varies upon intersection with the converging portion.

60. The slider assembly of claim 54, wherein said transverse pressurization contour along one edge of one of said rails is substantially symmetrical to said transverse pressurization contour along the other edge of said rail.

61. The slider assembly of claim 55, wherein said transverse pressurization contour along one edge of one of said rails is substantially non-symmetrical to said transverse pressurization contour along the other edge of said rail.

62. The slider assembly of claim 59, wherein said support structure is included in a magnetic recording system having an actuator and an arm, wherein said support structure may be positioned over said recording medium by movement of said arm by said actuator.

63. The slider assembly of claim 62, wherein said actuator is a rotary actuator.

64. The slider assembly of claim 54, wherein said transverse pressurization contours occupy in total from about 25% to about 45% of the faces of each of said rails.

65. The slider assembly of claim 54, wherein said transverse pressurization contours are linear tapers.

66. The slider assembly of claim 64, wherein said transverse pressurization contours are steps.

67. The slider assembly of claim 64, wherein said transverse pressurization contours are convex cylindrical surfaces.

68. A slider assembly for supporting a magnetic transducer in relation to a moving magnetic recording medium, comprising:

a support structure having leading and trailing edges relative to the motion of said recording medium, and a longitudinal axis disposed along the length of said support structure from said leading edge to said trailing edge;

at least one rail carried by said support structure defining a face toward said recording medium, said face being provided with a converging portion at said leading edge for pressurizing air between said face and said recording medium causing said slider assembly to fly at close proximity to said recording medium during moving of said recording medium;

wherein said rail is provided with transverse pressurization contours along each side edge of said face for producing pressurization in one of said contours and expansion in the second of said contours when air flow across said face has a substantially unidirectional transverse component, said transverse pressurization contours having an average angle with respect to said face of about 0.5 to about 2 degrees; and wherein said transverse pressurization contours are non-symmetrical with respect to each other.

69. The slider assembly of claim 68, wherein said transverse pressurization contours extend the full length of said rail.

70. The slider assembly of claim 68, wherein said transverse pressurization contours are substantially uniform in width along at least a portion of said rail.

71. The slider assembly of claim 68, wherein the width of at least one of said transverse pressurization contours is constant along the length of the rail except at the leading edge where the width varies upon intersection with the converging portion.

72. The slider assembly of claim 68, wherein said transverse pressurization contours are substantially uniform in depth along at least a portion of said rail.

73. The slider assembly of claim 68, wherein the depth of at least one of said transverse pressurization contours is constant along the length of the rail except at the leading edge where the depth varies upon intersection with the converging portion.

74. The slider assembly of claim 69, wherein said support structure is included in a magnetic recording system having an actuator and an arm, wherein said support structure may be positioned over said recording medium by movement of said arm by said actuator.

75. The slider assembly of claim 74, wherein said actuator is a rotary actuator.

76. The slider asssembly of claim 74, wherein said transverse pressurization contours occupy from about 25% to about 45% of the faces of each of said rails.

77. The slider assembly of claim 68, wherein said transverse pressurization contours are linear tapers.

78. The slider assembly of claim 76, wherein said transverse pressurization contours are steps.

79. The slider assembly of claim 74, wherein said transverse pressurization contours are convex cylindrical surfaces.

80. A slider assembly for supporting a magnetic transducer in relation to a moving magnetic recording medium, comprising:

a support structure having leading and trailing edges relative to the motion of said recording medium, and a longitudinal axis disposed along the length of said support structure from said leading edge to said trailing edge;

at least one rail carried by said support structure defining a face toward said recording medium, said face being provided with a converging portion at said leading edge for pressurizing air between said face and said recording medium causing said slider assembly to fly at close proximity to said recording medium during moving of said recording medium; and wherein said rail is provided with transverse pressurization contours along each side edge of said face for producing pressurization in one of said contours and expansion in the second of said contours when air flow across said face has a substantially unidirectional transverse component, said transverse pressurization contours having a stepped geometry having a height and width to define an average angle with respect to said face of about 0.5 to about 2 degrees.

81. The slider assembly of claim 80, wherein said transverse pressurization contours extend the full length of said rail.

82. The slider assembly of claim 80, wherein said transverse pressurization contours are substantially uniform in width along at least a portion of said rail.

83. The slider assembly of claim 80, wherein the width of at least one of said transverse pressurization contours is constant along the length of the rail except at the leading edge where the width varies upon intersection with the converging portion.

84. The slider assembly of claim 80, wherein said transverse pressurization contours are substantially uniform in depth along at least a portion of said rail.

85. The slider assembly of claim 80, wherein the depth of at least one of said transverse pressurization contours is constant along the length of the rail except at the leading edge where the depth varies upon intersection with the converging portion.

86. The slider assembly of claim 80, wherein said transverse pressurization contour along one edge of said rail is substantially symmetrical to said transverse pressurization contour along the other edge of said rail.

87. The slider assembly of claim 80, wherein said transverse pressurization contour along one edge of said rail is substantially non-symmetrical to said transverse pressurization contour along the other edge of said rail.

88. The slider assembly of claim 87, wherein said support structure is included in a magnetic recording system having an actuator and an arm, wherein said support structure may be positioned over said recording medium by movement of said arm by said actuator.

89. The slider assembly of claim 88, wherein said actuator is a rotary actuator.

90. The slider assembly of claim 87, wherein said transverse pressurization contours occupy in total from about 25% to about 45% of the faces of each of said rails.

91. A slider assembly for supporting a magnetic transducer in relation to a moving magnetic recording medium, comprising:

a support structure having leading and trailing edges relative to the motion of said recording medium, and a longitudinal axis disposed along the length of said support structure from said leading edge to said trailing edge;

at least one rail carried by said support structure defining a face toward said recording medium, said face being provided with a converging portion at said leading edge for pressurizing air between said face and said recording medium causing said slider assembly to fly at close proximity to said recording medium during moving of said recording medium;

wherein said rail is provided with stepped transverse pressurization contours along each side edge of said face for producing pressurization in one of said contours and expansion in the second of said stepped contours when air flow across said face has a substantially unidirectional transverse component, said stepped transverse pressurization contours having an average angle with respect to said face of about 0.5 to about 2 degrees; and wherein said support structure is included in a magnetic recording system having an actuator and an arm, wherein said support structure may be positioned over said recording medium by movement of said arm by said actuator.

92. The slider assembly of claim 91, wherein said transverse pressurization contours extend the full length of said rail.

93. The slider assembly of claim 91, wherein said transverse pressurization contours are substantially uniform in width along at least a portion of said rail.

94. The slider assembly of claim 91, wherein the width of at least one of said transverse pressurization contours is constant along the length of the rail except at the leading edge where the width varies upon intersection with the converging portion.

95. The slider assembly of claim 91, wherein said converging portion is provided with a liner taper.

96. The slider assembly of claim 91, wherein said transverse pressurization contours are substantially uniform in depth along at least a portion of said rail.

97. The slider assembly of claim 91, wherein the depth of at least one of said transverse pressurization contours is constant along the length of the rail except at the leading edge where the depth varies upon intersection with the converging portion.

98. The slider assembly of claim 91, wherein said transverse pressurization contour along one edge of said rail is substantially symmetrical to said transverse pressurization contour along the other edge of said rail.

99. The slider assembly of claim 91, wherein said transverse pressurization contour along one edge of said rail is substantially non-symmetrical to said transverse pressurization contour along the other edge of said rail.

100. The slider assembly of claim 91, wherein said actuator is a rotary actuator.

101. The slider assembly of claim 91, wherein said transverse pressurization contours occupy in total from about 25% to about 45% of the faces of each of said rails.

102. A slider assembly for supporting a magnetic transducer in relation to a moving magnetic recording medium, comprising:

a support structure having leading and trailing edges relative to the motion of said recording medium, and a longitudinal axis disposed along the length of said support structure from said leading edge to said trailing edge;

a pair of rails carried by said support structure, one along each edge thereof, each of said rails defining a face toward said recording medium, each of said faces of said rails being provided with a converging portion at said leading edge for pressurizing air between said faces and said recording medium causing said faces of said slider assembly to fly at a close spacing from said recording medium when said recording medium is moving;

wherein each of said rails is provided with step transverse pressurization contours along each side edge of said faces for producing pressurization of the air flow in one of said contours and expansion in the second of said contours of each of said rails when air flow across said faces has a substantially unidirectional transverse component, said step transverse pressurization contours having an average angle with respect to said faces of about 0.5 to about 2 degrees; and further comprising a cross rail connecting said rails proximate said leading edge, said cross rail and portions of said rails toward said trailing edge, defining a recessed section open at said trailing edge, said recessed section developing a subambient pressure.

103. The slider assembly of claim 102, wherein said transverse pressurization contours extend the full length of said rail.

104. A slider assembly for supporting a magnetic transducer in relation to a moving magnetic recording medium, comprising:

a support structure having leading and trailing edges relative to the motion of said recording medium, and a longitudinal axis disposed along the length of said support structure from said leading edge to said trailing edge;

a pair of rails carried by said support structure, one along each edge thereof, each of said rails defining a face toward said recording medium, each of said faces of said rails being provided with a converging portion at said leading edge for pressurizing air between said faces and said recording medium causing said faces of said slider assembly to fly at a close spacing from said recording medium when said recording medium is moving;

wherein each of said rails is provided with transverse pressurization contours along each side edge of each face, and wherein said transverse pressurization contour along one edge of one of said rails is substantially non-symmetrical to said transverse pressurization contour along the other edge of said rail, said transverse pressurization contours for producing pressurization of the air flow in one of said contours and expansion in the other of said contours of each of said rails when air flow across said faces has a substantially unidirectional transverse component, said transverse pressurization contours having an average angle with respect to said faces of about 0.5 to about 2 degrees; and further comprising a cross rail connecting said rails proximate said leading edge, said cross rail and portions of said rails toward said trailing edge, defining a recessed section open at said trailing edge, said recessed section developing a subambient pressure.

105. The slider assembly of claim 104, wherein said transverse pressurization contours extend the full length of said rail.

106. A slider assembly for supporting a magnetic transducer in relation to a moving magnetic recording medium, comprising:

a support structure having leading and trailing edges relative to the motion of said recording medium, and a longitudinal axis disposed along the length of said support structure from said leading edge to said trailing edge;

at least one rail carried by said support structure defining a face toward said recording medium, said face being provided with a converging portion at said leading edge for pressurizing air between said face and said recording medium causing said slider assembly to fly at close proximity to said recording medium during moving of said recording medium;

wherein said rail is provided with stepped transverse pressurization contours along each side edge of said face for producing pressurization in one of said contours and expansion in the second of said stepped contours when air flow across said face has a substantially unidirectional transverse component, said stepped transverse pressurization contours having an average angle with respect to said face of about 0.5 to about 2 degrees; and wherein the width of one of said transverse pressurization contours is different than the width of the transverse pressurization contour on the opposite side edge of said face.

107. The slider assembly of claim 106, wherein said transverse pressurization contours extend the full length of said rail.

108. The slider assembly of claim 106, wherein said transverse pressurization contour along one edge of said rail is substantially non-symmetrical to said transverse pressurization contour along the other edge of said rail, said transverse pressurization contours being provided to control flying height and roll of the slider assembly such that the slider assembly is less affected by skew and accessing velocity, whereby a wider range of skew angles may be accommodated.

109. A slider assembly for supporting a magnetic transducer in relation to a moving magnetic recording medium, comprising:

a support structure having leading and trailing edges relative to the motion of such medium, and a longitudinal axis disposed along the length of said support structure from said leading edge to said trailing edge;

a pair of rails carried by said support structure one along each edge thereof, each of said rails defining a face toward said recording medium, said faces each being provided with a linear taper at said leading edge for pressurization of air between said faces and said recording medium whereby said faces fly at close proximity to said recording medium when said recording medium is moving;

wherein said faces are each further provided with transverse pressurization contours along each side edge of said faces for providing pressurization in one of said contours and expansion in the second of said contours when air flow across said faces has a substantially unidirectional transverse component, wherein each of said contours is a convex cylindrical surface having a height and width at said edges to define an average angle with respect to said faces of about 0.5 to about 2 degrees; and wherein said transverse pressurization contour along one edge of one of said rails is substantially non-symmetrical to said transverse pressurization contour along the other edge of said rail.

110. A slider assembly for supporting a magnetic transducer in relation to a moving magnetic recording medium, comprising:

a support structure having leading and trailing edges relative to the motion of said recording medium, and a longitudinal axis disposed along the length of said support structure from said leading edge to said trailing edge;

at least one rail carried by said support structure defining a face toward said recording medium, said face being provided with a converging portion at said leading edge for pressurizing air between said face and said recording medium causing said slider assembly to fly at close proximity to said recording medium during moving of said recording medium;

wherein said rail is provided with transverse pressurization contours along each side edge of said face for producing pressurization in one of said contours and expansion in the second of said contours when air flow across said face has a substantially unidirectional transverse component, said transverse pressurization contours having an average angle with respect to said face of about 0.5 to about 2 degrees; and wherein said transverse pressurization contours occupy in total from about 25% to 45% of said face, and wherein said transverse pressurization contour along one edge of said rail is substantially non-symmetrical to said transverse pressurization contour along the other edge of said rail.

111. The slider assembly of claim 110, wherein said support structure is included in a magnetic recording system having an actuator and an arm, wherein said support structure may be positioned over said recording medium by movement of said arm by said actuator.

112. The slider assembly of claim 111, wherein said actuator is a rotary actuator.

113. The slider assembly of claim 111, wherein transverse pressurization contours are convex cylindrical surfaces.

114. A slider assembly for supporting a magnetic transducer in relation to a moving magnetic recording medium, comprising:

a support structure having leading and trailing edges relative to the motion of said recording medium, and a longitudinal axis disposed along the length of said support structure from said leading edge to said trailing edge;

at least one rail carried by said support structure defining a face toward said recording medium, said face being provided with a converging portion at said leading edge for pressurizing air between said face and said recording medium causing said slider assembly to fly at close proximity to said recording medium during moving of said recording medium;

wherein said rail is provided with transverse pressurization contours along each side edge of said face for producing pressurization in one of said contours and expansion in the second of said contours when air flow across said face has a substantially unidirectional transverse component, said transverse pressurization contours having an average angle with respect to said face of about 0.5 to about 2 degrees; and wherein said transverse pressurization contours occupy in total from about 25% to 45% of said face, and wherein said transverse pressurization contours are steps.

115. A slider assembly for supporting a magnetic transducer in relation to a rotatable disk magnetic recording medium, said slider assembly adapted for rotary access across said disk thereby causing said slider to be oriented at various skew angles with respect to the direction of rotation of said disk, said slider assembly exhibiting substantially improved resistance to change in flying height and roll angle during skewed operation and/or said access, comprising:

a support structure having a length and width, leading edge and a trailing edge relative to said rotary motion of said disk, and a longitudinal axis disposed along said length from said leading edge to said trailing edge, with angles between said longitudinal axis and said direction of said rotation of said disk defining said skew angles;

a pair of rails carried by said support structure symmetrically located from said longitudinal axis at opposite edges of said support structure, said rails defining a deep recess therebetween extending from said leading edge and said trailing edge, each of said rails having an exposed substantially flat face oriented toward said disk, each of said faces of said rails being provided with a converging linear taper having a selected angle of about ½ to 2 degrees at said leading edge for pressurization of air between said faces and said disk when said disk is rotating to cause said faces to fly at a close spacing to said disk;

wherein said rails are provided with a symmetrical transverse pressurization contour having a linear taper of a selected angle of about ½ to 2 degrees along each edge of said faces for producing pressurization of air flow in one of said tapers of each of said rails and expansion of said air flow in the other of said tapers of each of said rails when said slider is operated at a skew angle and/or radially accessed across said disk; and wherein said transverse pressurization contours occupy in total from about 25% to 45% of said faces of said rails; and further comprising a cross rail connecting said rails proximate said leading edge, said cross rail and portions of said rails toward said trailing edge, defining a recessed section open at said trailing edge, said recessed section developing a subambient pressure.

116. A slider assembly for supporting a magnetic transducer in relation to a moving magnetic recording medium, comprising:

a support structure having leading and trailing edges relative to the motion of such medium, and a longitudinal axis disposed along the length of said support structure from said leading edge to said trailing edge;

a pair of rails carried by said support structure one along each edge thereof, each of said rails defining a face toward said recording medium, said faces each being provided with a linear taper at said leading edge for pressurization of air between said faces and said recording medium whereby said faces fly at close proximity to said recording medium when said recording medium is moving;

wherein said faces are each further provided with transverse pressurization contours along each side edge of said faces for producing pressurization in one of said contours and expansion in the second of said contours when air flow across said faces has a substantially unidirectional transverse component, wherein each of said contours is a convex cylindrical surface having a height and width at said edges to define an average angle with respect to said faces of about 0.5 to about 2 degrees; and further comprising a cross rail connecting said rails proximate said leading edge, said cross rail and portions of said rails toward said trailing edge, defining a recessed section open at said trailing edge, said recessed section developing a subambient pressure.

117. A slider assembly for supporting a magnetic transducer in relation to a moving magnetic recording medium, comprising:

a support structure having leading and trailing edges relative to the motion of such medium, and a longitudinal axis disposed along the length of said support structure from said leading edge to said trailing edge;

a pair of rails carried by said support structure, one along each edge thereof, each of said rails defining a face toward said recording medium, said faces each being provided with a linear taper at said leading edge for pressurization of air between said faces and said recording medium whereby said faces fly at close proximity to said recording medium when said recording medium is moving;

wherein said faces are each further provided with transverse pressurization contours along each side edge of said faces for producing pressurization in one of said contours and expansion in the second of said contours when air flow across said faces has a substantially unidirectional transverse component, said contours being linear tapers having an angle of about 0.5 to about 2 degrees with respect to said faces; and wherein said transverse pressurization contours in total occupy from about 25 to about 45% of said face of each rail; and wherein said transverse pressurization contour along one edge of one of said rails is substantially non-symmetrical to said transverse pressurization contour along the other edge of said rail.

118. A slider assembly for supporting a magnetic transducer in relation to a moving magnetic recording medium, comprising:

a support structure having leading and trailing edges relative to the motion of such medium, and a longitudinal axis disposed along the length of said support structure from said leading edge to said trailing edge;

a pair of rails carried by said support structure, one along each edge thereof, each of said rails defining a face toward said recording medium, said faces each being provided with a linear taper at said leading edge for pressurization of air between said faces and said recording medium whereby said faces fly at close proximity to said recording medium when said recording medium is moving;

wherein said faces are each further provided with transverse pressurization contours along each side edge of said faces for producing pressurization in one of said contours and expansion in the second of said contours when air flow across said faces has a substantially unidirectional transverse component, said contours being linear tapers having an angle of about 0.5 to about 2 degrees with respect to said faces; and wherein said transverse pressurization contours in total occupy from about 25 to about 45% of said face of each rail; and further comprising a cross rail connecting said rails proximate said leading edge, said cross rail and portions of said rails toward said trailing edge, defining a recessed section open at said trailing edge, said recessed section developing a subambient pressure.

119. A slider assembly for supporting a magnetic transducer in relation to a moving magnetic recording medium, comprising:

a support structure having leading and trailing edges relative to the motion of said recording medium, and a longitudinal axis disposed along the length of said support structure from said leading edge to said trailing edge;

a pair of rails carried by said support structure, one along each edge thereof, each of said rails defining a face toward said recording medium, each of said faces of said rails being provided with a converging portion at said leading edge for pressurizing air between said faces and said recording medium causing said faces of said slider assembly to fly at a close spacing from said recording medium when said recording medium is moving;

wherein each of said rails is provided with transverse pressurization contours along each side edge of said faces for producing pressurization of the air flow in one of said contours and expansion in the second of said contours of each of said rails when air flow across said faces has a substantially unidirectional transverse component, said transverse pressurization contours having an average angle with respect to said faces of about 0.5 to about 2 degrees;

wherein said converging portion of each of said faces of said rails at said leading edge is a linear taper, and each of and transverse pressurization contours along each side edge of said rails is a convex cylindrical surface having a height and width to establish said average angle of about 0.5 to 2 degrees with respect to said faces; and wherein said transverse pressurization contour along one edge of one of said rails is substantially non-symmetrical to said transverse pressurization contour along the other edge of said rail.

120. The slider assembly of claim 119, wherein said support structure is included in a magnetic recording system having an actuator and an arm, wherein said support structure may be positioned over said recording medium by movement of said arm by said actuator.

121. The slider assembly of claim 120, wherein said actuator is a rotary actuator.

122. A slider assembly for supporting a magnetic transducer in relation to a moving magnetic recording medium, comprising:

a support structure having leading and trailing edges relative to the motion of said recording medium, and a longitudinal axis disposed along the length of said support structure from said leading edge to said trailing edge;

a pair of rails carried by said support structure, one along each edge thereof, each of said rails defining a face toward said recording medium, each of said faces of said rails being provided with a converging portion at said leading edge for pressurizing air between said faces and said recording medium causing said faces of said slider assembly to fly at a close spacing from said recording medium when said recording medium is moving;

wherein each of said rails is provided with transverse pressurization contours along each side edge of said faces for producing pressurization of the air flow in one of said contours and expansion in the second of said contours of each of said rails when air flow across said faces has a substantially unidirectional transverse component, said transverse pressurization contours having an average angle with respect to said faces of about 0.5 to about 2 degrees;

wherein said converging portion of each of said faces of said rails at said leading edge is a linear taper, and each of and transverse pressurization contours along each side edge of said rails is a convex cylindrical surface having a height and width to establish said average angle of about 0.5 to 2 degrees with respect to said faces; and further comprising a cross rail connecting said rails proximate said leading edge, said cross rail and portions of said rails toward said trailing edge, defining a recessed section open at said trailing edge, said recessed section developing a subambient pressure.

123. A slider assembly for supporting a magnetic transducer in relation to a moving magnetic recording medium, comprising:

a support structure having leading and trailing edges relative to the motion of said recording medium, and a longitudinal axis disposed along the length of said support structure from said leading edge to said trailing edge;

at least one rail carried by said support structure defining a face toward said recording medium, said face being provided with a converging portion at said leading edge for pressurizing air between said face and said recording medium causing said slider assembly to fly at close proximity to said recording medium during moving of said recording medium;

wherein said rail is provided with transverse pressurization contours along each side edge of said face for producing pressurization in one of said contours and expansion in the second of said contours when air flow across said face has a substantially unidirectional transverse component, said transverse pressurization contours having a convex cylindrical geometry having a height and width to define an average angle with respect to said face of about 0.5 to about 2 degrees; and wherein said transverse pressurization contour along one edge of said rail is substantially non-symmetrical to said transverse pressurization contour along the other edge of said rail.

* * * * *